United States Patent
Mishra

(10) Patent No.: US 8,254,891 B2
(45) Date of Patent: Aug. 28, 2012

(54) INITIATING CONTACT USING PROTECTED CONTACT DATA IN AN ELECTRONIC DIRECTORY

(75) Inventor: Abhishek Kumar Mishra, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1011 days.

(21) Appl. No.: 11/462,434

(22) Filed: Aug. 4, 2006

(65) Prior Publication Data

US 2008/0044031 A1 Feb. 21, 2008

(30) Foreign Application Priority Data

Jun. 23, 2006 (IN) .......................... 1485/DEL/2006

(51) Int. Cl.
*H04M 3/42* (2006.01)
*H04L 9/08* (2006.01)
*H04L 29/06* (2006.01)

(52) U.S. Cl. ..................... 455/414.1; 380/279; 380/283; 713/163; 713/182

(58) Field of Classification Search ............... 379/91.01, 379/91.02, 355, 354; 455/411, 517; 705/64, 705/65, 67, 50, 51, 52, 53, 54, 55; 707/1, 707/2, 3; 380/270, 271, 272, 273, 274, 280, 380/281, 282, 283; 713/163, 150, 151, 152, 713/153, 154, 155
See application file for complete search history.

(56) References Cited

U.S. PATENT DOCUMENTS

| | | | |
|---|---|---|---|
| 5,265,159 A | 11/1993 | Kung | |
| 6,594,758 B1 * | 7/2003 | Okui ............................ | 713/163 |
| 6,862,684 B1 * | 3/2005 | DiGiorgio ..................... | 713/163 |
| 6,898,577 B1 * | 5/2005 | Johnson ......................... | 705/51 |
| 6,915,124 B1 | 7/2005 | Kiessling et al. | |
| 6,980,659 B1 * | 12/2005 | Elliott ............................ | 380/277 |
| 7,099,304 B2 * | 8/2006 | Liu et al. ....................... | 370/352 |
| 7,395,425 B2 * | 7/2008 | Nakano et al. ................. | 713/163 |
| 7,539,306 B2 * | 5/2009 | Ohta et al. ..................... | 380/201 |
| 7,827,416 B2 * | 11/2010 | Hanazaki ....................... | 713/193 |
| 2001/0019614 A1 * | 9/2001 | Madoukh ....................... | 380/277 |
| 2001/0046282 A1 * | 11/2001 | Bailey, III ................... | 379/93.25 |
| 2002/0007455 A1 * | 1/2002 | Wiederin et al. .............. | 713/162 |

(Continued)

OTHER PUBLICATIONS

Unknown, "Backup, Restore & Edit Mobil Phone Contacts—SIMBackup—500E™," TeleAdapt Inc., 1 page, printed Jul. 26, 2006, http://www.teleadapt.com/images_special/SIMBackup500E.pdf.

(Continued)

*Primary Examiner* — Ahmad Matar
*Assistant Examiner* — Kharye Pope
(74) *Attorney, Agent, or Firm* — Senniger Powers LLP

(57) ABSTRACT

A client application allows a user of a telecommunication device to retrieve contact data of a particular individual from a server to initiate contact with the particular individual without viewing content designated as private by the particular individual. The retrieved contact data includes encrypted content and non-encrypted content. The telecommunication device sends a directory request to the server requesting contact data from an electronic directory stored on the server. If the directory request is validated by the server, the telecommunication device receives the requested contact data from the server. The telecommunication device also receives a decryption key and a key expiration parameter from the server. The client application executing on the telecommunication device can use the decryption key within a time period defined by the key expiration parameter to decrypt encrypted contacted data on the telecommunication device to initiate contact with the particular individual.

7 Claims, 8 Drawing Sheets

U.S. PATENT DOCUMENTS

| | | |
|---|---|---|
| 2002/0010679 A1* | 1/2002 | Felsher .......................... 705/51 |
| 2002/0026579 A1* | 2/2002 | Wiederin et al. ............. 713/162 |
| 2002/0052921 A1 | 5/2002 | Morkel |
| 2002/0053019 A1* | 5/2002 | Ruttan et al. .................. 713/152 |
| 2002/0138442 A1* | 9/2002 | Hori et al. ....................... 705/59 |
| 2002/0178364 A1* | 11/2002 | Weiss ............................ 713/182 |
| 2003/0004881 A1* | 1/2003 | Shinzaki et al. ................ 705/51 |
| 2003/0087601 A1 | 5/2003 | Agam et al. |
| 2003/0099361 A1* | 5/2003 | Uchida ........................ 380/277 |
| 2003/0217288 A1* | 11/2003 | Guo et al. ..................... 713/201 |
| 2003/0233409 A1 | 12/2003 | Awada et al. |
| 2004/0018852 A1 | 1/2004 | Burke et al. |
| 2004/0148506 A1 | 7/2004 | Prince |
| 2005/0008160 A1* | 1/2005 | Izawa et al. ................... 380/270 |
| 2005/0059418 A1 | 3/2005 | Northcutt |
| 2005/0091272 A1* | 4/2005 | Smith et al. ................ 707/104.1 |
| 2005/0102507 A1* | 5/2005 | Sozzani et al. ................ 713/165 |
| 2005/0147250 A1 | 7/2005 | Tang |
| 2005/0226424 A1* | 10/2005 | Takata et al. .................. 380/279 |
| 2005/0228994 A1 | 10/2005 | Kasai et al. |
| 2005/0245241 A1* | 11/2005 | Durand et al. ............. 455/414.1 |
| 2005/0251448 A1 | 11/2005 | Gropper |
| 2005/0259666 A1 | 11/2005 | Okawa |
| 2005/0282578 A1 | 12/2005 | Vander Veen et al. |
| 2006/0005017 A1 | 1/2006 | Black et al. |
| 2006/0032912 A1 | 2/2006 | Mitchell et al. |
| 2007/0118426 A1* | 5/2007 | Barnes, Jr. ...................... 705/14 |
| 2007/0189542 A1* | 8/2007 | Alldredge .................... 380/283 |
| 2007/0208933 A1* | 9/2007 | Sudo et al. .................... 713/153 |
| 2008/0031458 A1* | 2/2008 | Raja .............................. 380/279 |
| 2008/0195585 A1* | 8/2008 | Altberg et al. .................... 707/3 |
| 2008/0214149 A1* | 9/2008 | Ramer et al. ............... 455/414.1 |
| 2010/0063913 A1* | 3/2010 | Wiederin et al. ................ 705/34 |

OTHER PUBLICATIONS

Unknown, "J2ME-Applications for Mobile Phones," 4 pages, printed Feb. 27, 2006, http://www.garret.ru/~knizhnik/En_DataBase.htm.

Unknown, "Kyocera-Smartphone Software: Security & Backup," 2 pages, printed Feb. 27, 2006, http://store.kyocerawireless.com/sofware_detail.aspx?productID=3220&category=5669.

Unknown, "Security Strategy—Nokia Mobile Phones get Encryption," CNET Networks, Inc., 2 pages, printed Feb. 27, 2006, http://software.silicon.com/security/0,39024655,39123461,00.htm.

* cited by examiner

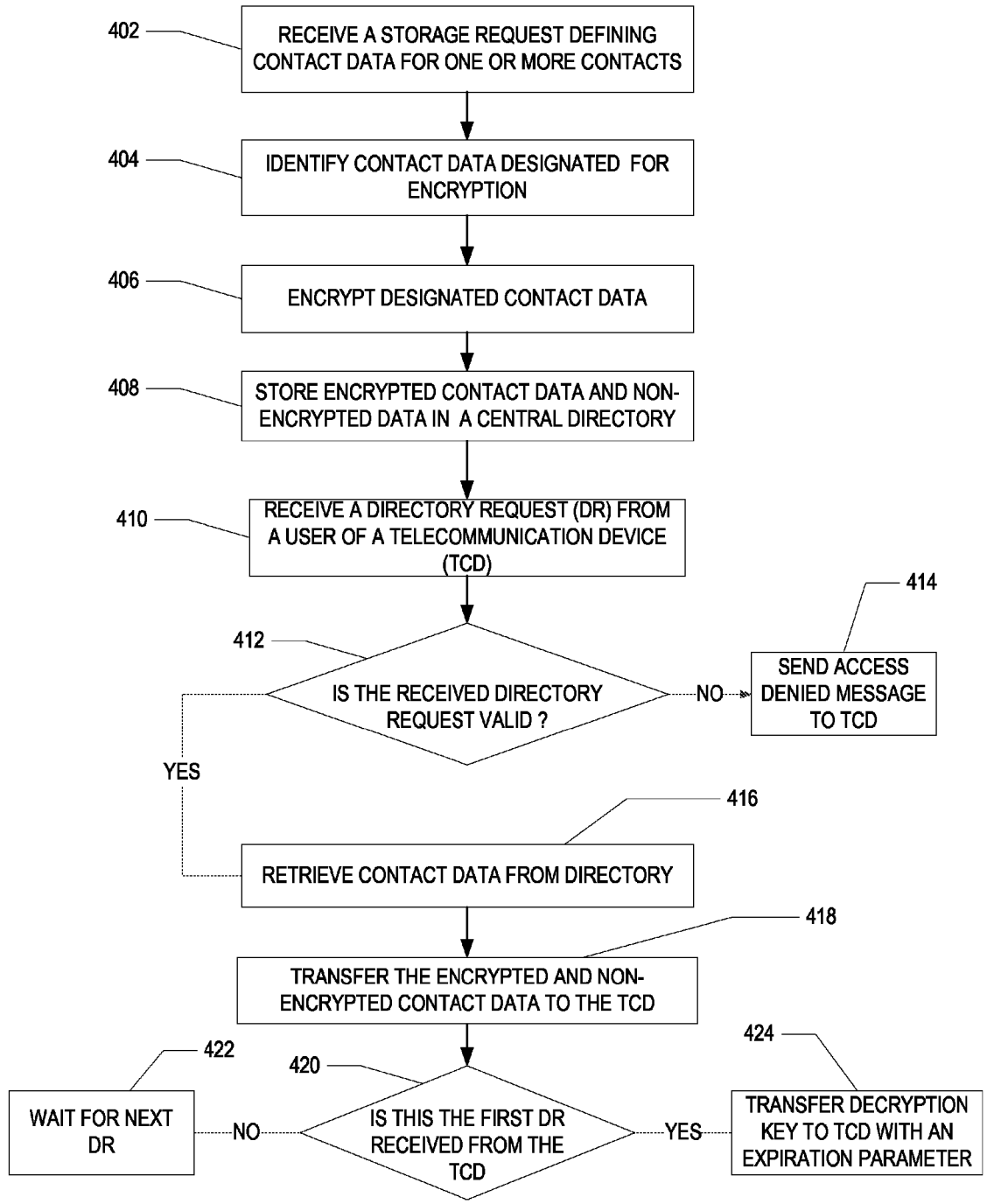

INITIATING CONTACT USING PROTECTED CONTACT DATA IN AN ELECTRONIC DIRECTORY

CROSS-REFERENCE TO RELATED APPLICATION

This application claims priority to India Application No. 1485DEL/2006 filed on Jun. 23, 2006.

BACKGROUND

With the growth of computer and information systems and related network technologies such as wireless and Internet communications, ever increasing amounts of electronic information are communicated, transferred and subsequently processed by users and/or systems. As an example, wireless telecommunication devices such as mobile phones are not only a popular method for voice communications, but are also a popular means for communicating various types of electronic information. In particular, with the advent of wireless Internet technology, such telecommunication devices are being used by more and more people to retrieve and store contact information for the purpose of initiating contact with one or more individuals. For example, conventional telecommunication devices provide users the ability to access an electronic directory that serves as a centralized place where users can keep all their contact information. More specifically, users can view custom electronic directories that store email addresses, names, telephone numbers, and other contact information for individuals they frequently communicate with via the telecommunication device.

Organizations and businesses frequently maintain custom electronic directories that store information for employees, contractors, and/or clients and may provide the same employees, contractors, and/or clients that have been authorized the ability to download contact information from the electronic directory for storage in a local directory on their telecommunication device. However, for business and/or security reasons, it may be prudent to keep some of an individual's contact information private and/or limit the duration downloaded contact information can be used to initiate contact with a particular individual. For example, consider a client meets with a financial advisor John of company XYZ. The client gives John his phone number which John stores in his mobile phone. After John leaves company XYZ and joins company ABC, he still has the client's number stored in his mobile phone and calls the client asking him to bring his investments to Bank ABC. This is could potentially result in company XYZ losing a client. As another example, consider a company has contracted with a particular taxi service to provide employees safe transportation to their vehicle or home when leaving work during a particular period of time (e.g., 8 PM-6 AM). The company provides the taxi drivers phone number of all the employees to be picked up and the drivers give a call 5-10 minutes before the person is to be picked up. If a particular taxi driver's employment is later terminated, the driver will still have the employees numbers stored in his mobile phone and can call a particular employee under the pretext that he is still a driver, when in fact, the ex-driver may have more deviant motives.

Thus, even if a particular individual agrees to have their name and telephone number information included in the custom directory, that individual or the Organization may desire to keep their phone number private. Unfortunately, after contact information is downloaded from a shared electronic directory, conventional telecommunication devices allow users to view all of the downloaded contact information. As a result, some individual may request that there information not be maintained in such a shared electronic directory.

SUMMARY

Aspects of the invention allow for the storage of non-encrypted and encrypted contact data in a custom address directory. One embodiment of the invention provides a server application for defining and selectively designating contact data for encryption prior to storage in the custom directory, and for defining an expiration time after which the contact data is unusable after being downloaded to an end user of a telecommunication device. Other embodiments of the invention involve a client application for decrypting encrypted contact data downloaded from a custom directory required to initiate contact with a particular individual, while preventing the decrypted contact data from being viewed by the user of the telecommunication device. Accordingly, a user of the telecommunication can initiate contact with a particular individual, but cannot view the decrypted contact data required to initiate contact.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 4 is an exemplary flow chart illustrating a method for storing contact data to be stored in a shared electronic directory according to one exemplary embodiment of the invention.

Corresponding reference characters indicate corresponding parts throughout the drawings.

DETAILED DESCRIPTION

Figure 1:
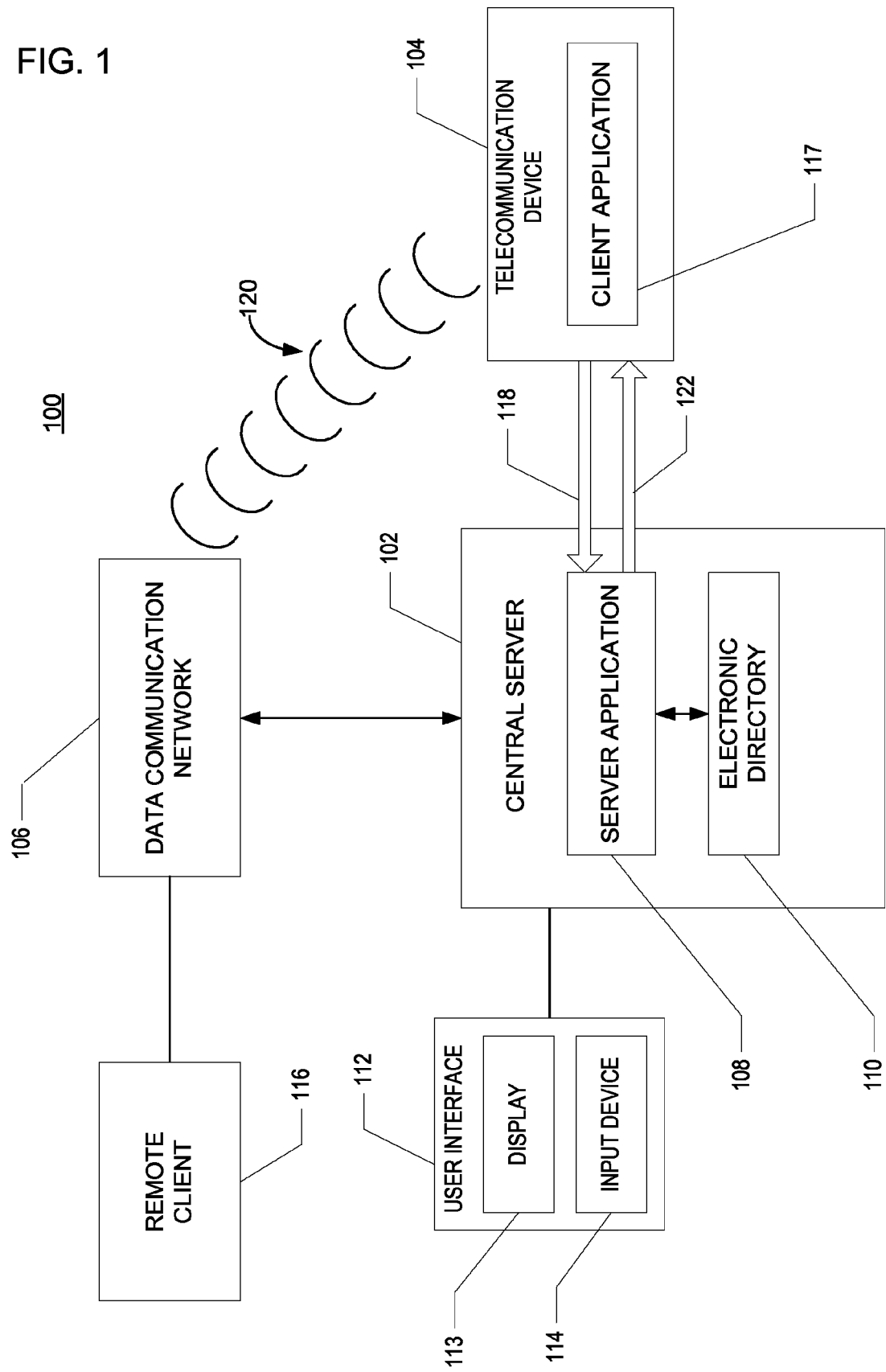
FIG. 1 is an exemplary block diagram illustrating a suitable operating environment in which embodiments of the invention may be implemented.

Referring first to FIG. 1, an exemplary block diagram illustrates a suitable operating environment 100 in which embodiments of the invention may be implemented. In this instance, FIG. 1 diagrammatically shows cross network communication between a central server 102 and a telecommunication device 104. More specifically, embodiments of the invention are described in the context of the server 102 communicatively linked to the telecommunication device 104 such that contact data stored in an electronic directory can be exchanged between the server 102 and the telecommunication device 104. The central server 102 is coupled to the telecommunication device 104 via a data communication network 106. In this example, the data communication network 106 is the Internet (or the World Wide Web) and facilitates the transfer of contact data between the server 102 and the telecommunication device 104. However, the teachings of the invention can be applied to any data communication network. In this example, the server 102 and telecommunication device 104 communicate data among themselves using the a Wireless Application Protocol (WAP), a protocol commonly used to provide Internet service to digital mobile phones and other wireless terminals.

The server 102 executes a server application 108 to create and/or update an electronic directory 110 storing contact data for one or more individuals. The electronic directory 110 stores contact data such as the first name, last name, email address, phone number, mailing address, job title, and employer name of one or more individuals that have agreed to have their contact information included in the electronic directory 110.

A user-interface (UI) 112 coupled to the server 102 allows an administrator, or user, of the server 102 to interact with the server application 108. For example, the UI 112 may include a display 113 such as a computer monitor for viewing contact data and/or input forms, and an input device 114 such as a keyboard or a pointing device (e.g., a mouse, trackball, pen, or touch pad) for entering contact data for individuals into the input form (see FIG. 2B). For example, consider Ann Smith decides to have her financial portfolio managed by XYZ Bank. Thereafter, a representative of XYZ Bank explains to Ms. Smith that the XYZ Bank offers a service whereby her contact information (e.g., first name, last name, cell numbers, work number, home number, etc.) can be added to a shared directory maintained on a central server so and that appropriate XYZ Bank personnel can download her contact data from the shared directory to their mobile phones. If Ms. Smith decides to use the service, the bank can obtain her contact data by phone, in person, or through an electronic communication (e.g., e-mail, fax) to include in the directory. Thereafter, the administrator uses the UI 112 to enter the contact data into the electronic directory 110. Alternatively, a remote client computer 116 may be coupled to the server 102 via the communication network 106 such that Ms. Smith may directly interact with an input form provided by the server application 108 to enter her contact data into the electronic directory 110.

A client application 117 executed on the telecommunication device 104 is responsive to user input to generate a directory request, as indicated by arrow 118, that is provided to the server 102 via a wireless communication signal, as indicated by reference character 118. The server 102 is responsive to the received directory request 118 to retrieve contact data from the electronic directory 110 and to transfer the retrieved contact data to the telecommunication device 104. As explained in more detail below, according to one aspect of the invention, the server application 108 authenticates the received directory request 118 to determine if it is valid prior to transferring the contact data to the telecommunication device 104. After the telecommunication device 104 is authenticated, the server application 108 transfers contact data from the directory 110 to the telecommunication device 104, as indicated by arrow 122. The user of the telecommunication device 104 can then interact with a user interface on a display (e.g., See FIG. 3) of the telecommunication device 104 to view the received contact data, search the contact data for a particular individual, and/or initiate a call to a particular individual by highlighting the individuals contact data (e.g., name) and pressing a call button (e.g., "Send" or "Talk" key).

However, even if a particular individual agrees to have their contact information stored in the electronic directory 110, that particular individual may also desire to prevent particular content included in the contact data, such as their telephone number, from being viewed by users of the telecommunications device 104 even if such users are otherwise authorized to access their contact data. According to one embodiment of the present invention, the server application 108 is configured to encrypt designated contact data prior to storage in the electronic directory 110. In other words, the electronic directory 110 may include encrypted and non-encrypted contact data for a particular individual. For example, a particular individual's telephone number may be encrypted, while that individual's first and/or last name is not encrypted. Thus, the user of the telecommunication device 104 can view and interact with an individual's name via the display of the telecommunication device 104 to initiate a call, but cannot view the individual's phone number. The client application 117 is responsive to the user selecting non-encrypted name data of a particular individual and pressing, for example, the send button to decrypt the corresponding encrypted phone data to initiate a call to that particular individual. Moreover, the client application 117 will not display the decrypted phone data on the telecommunication device 104. As a result, the present invention provides an improved electronic directory 110 that allows individuals to store contact data in a shared electronic directory, and yet maintain designated contact data private.

Notably, although the invention is described herein in the context of maintaining telecommunication contact data such as a phone number private, it is contemplated that the principles of the invention can be applied to maintain other personal contact information such as an email address, instant messaging accounts or any other forms of contact information of an individual.

The exemplary operating environment illustrated in FIG. 1 includes a general purpose computing device (e.g., server 102) such as a computer executing computer-executable instructions. The computing device typically has at least some form of computer readable media (e.g., CRM 130). Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. A user may enter commands and information into the computing device through the input device (e.g., input device 114). Other input devices (not shown) may be connected to the computing device. The computing device may operate in a networked environment using logical connections to one or more remote computers.

Although described in connection with an exemplary computing system environment, embodiments of the invention are operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Figure 2A:
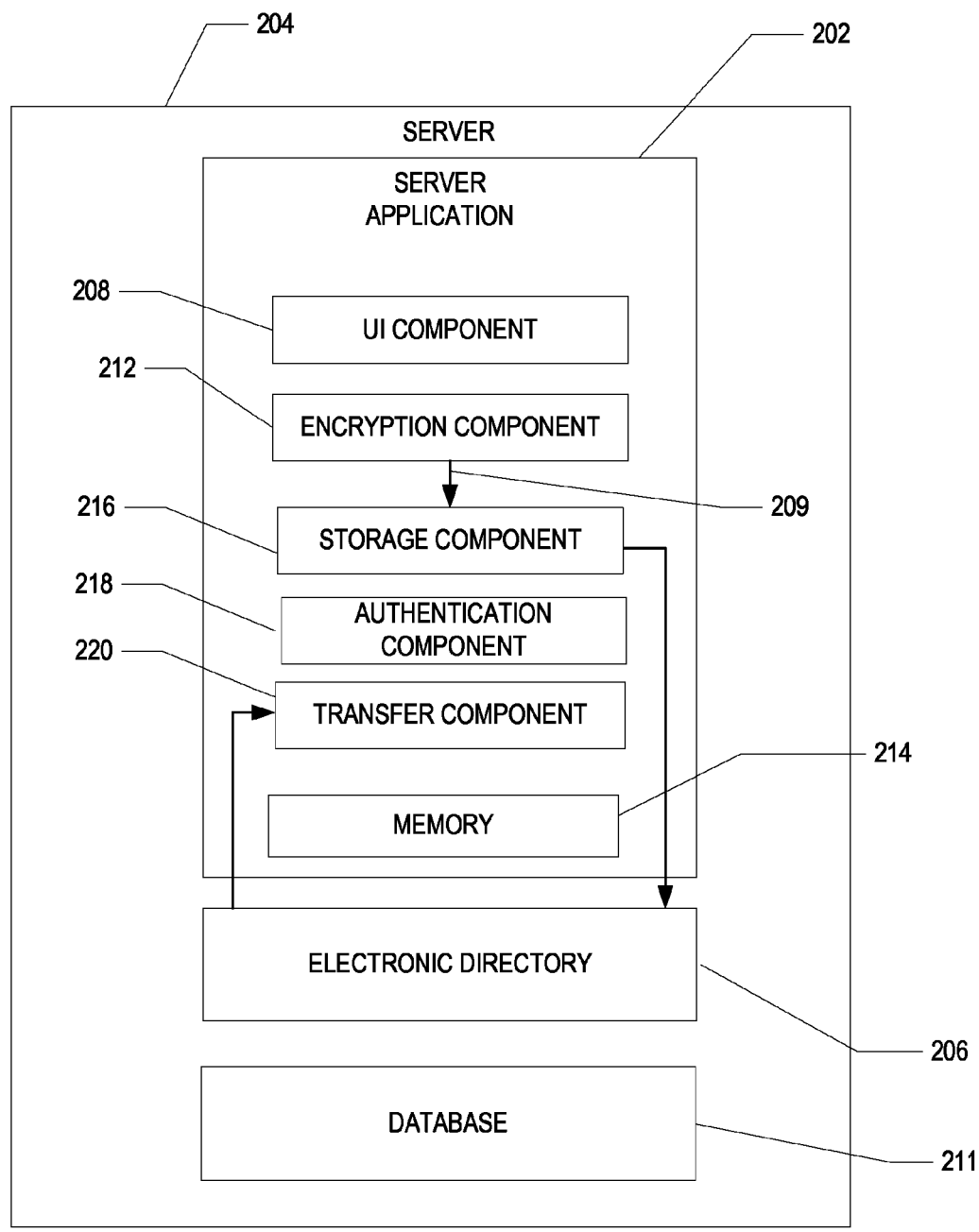
FIG. 2A is an exemplary block diagram illustrating components of a server email application according to one embodiment of the invention.

Referring now to FIG. 2A, an exemplary block diagram illustrates components of a server application 202 (e.g., server application 108) being executed on a server 204 (e.g., server 102) for managing a shared electronic directory 206 storing contact data of one or more individuals. In particular, the server application 202 maintains a shared electronic directory 206 containing contact data for individuals such as business associates or clients of a business or organization. As described above, contact data can include the first name, last name, email address, phone number, mailing address, job title, and employer name for such business associates or clients. In this particular embodiment, the server application 202 maintains encrypted and non-encrypted content of contact data. For example, the shared electronic directory 206 may include non-encrypted content such as a first name, a last name, and an employer name for a particular client or business associate, and may also include corresponding encrypted content such as a telephone number or email address for that same particular client or business associate.

A UI component 208 is responsive to a data entry request received from, for example, an administrator of the server 204 using a user interface device (e.g., UI 112) to transfer a contact data entry form to the UI device 112 that allows the administrator to define contact data of a particular individual for storage in the shared electronic directory 206. As described above in reference to FIG. 1, the UI device 112 allows the administrator to interact with the contact data form to generate a storage request as indicated by reference character 209.

Figure 2B:
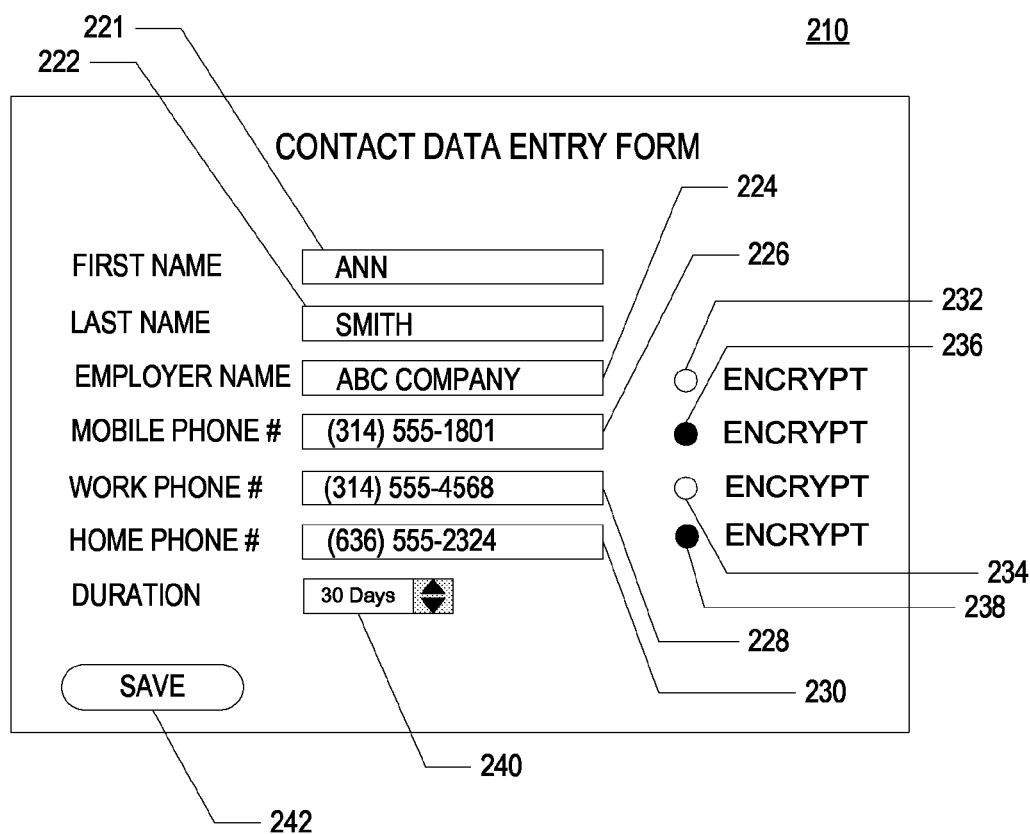
FIG. 2B is a screen shot of an exemplary directory form defining contact data according to one embodiment of the invention.

Referring now to FIG. 2B, there is shown an exemplary contact data form 210 used by the administrator to enter contact data of one or more individuals. Referring to the example above, using information provided by Ms. Smith, the administrator interacts with the displayed contact data form 210 to enter contact data into the appropriate contact data fields and can designate content included in contact data for encryption by selecting a corresponding encryption option button. For example, the contact data form 210 includes various data entry fields that each correspond to different content.

In this example, the various entry fields include a first name field 221, a last name field 222, an employer name field 224, a mobile number field 226, a work number field 228, and a home number field 230. In the example shown in FIG. 2B, because encryption option buttons 232, 234 are not selected the name of Ann Smith's employer and her work number will be stored in non-encrypted formats. In contrast, encryption option buttons 236, 238 are selected, and, thus, Ann Smith's mobile phone number and home phone number will each be stored in an encrypted format. Notably, the contact data form 210 shown in FIG. 2B is for illustration purposes only and it is contemplated that additional and/or different contact data could be defined and/or designated for encryption. The contact data form 210 includes a duration 240 field that allows the administrator to define a contact data expiration parameter. The contact expiration parameter corresponds a specific duration of time during which a particular individual (e.g., Ann Smith) has authorized their contact data to be maintained in the electronic directory. For example, the contact data expiration parameter may set a maximum period of three (3) months, beginning from the contact data is submitted to the server for storage in the shared directory, during which the contact data can be maintained in the shared directory 206. After the administrator completes data entry for Ms. Smith, the administrator selects, for example, a save option 242 to generate the storage request 209 to add her contact data to the electronic directory 206.

Referring again to FIG. 2A, an encryption component 212 is responsive to the received storage request 209 to determine if any of the contact data has been designated for encryption. More specifically, the encryption component 212 examines the value of an encryption attribute, or flag, associated with each of the various types of contact data to determine if any of the contact data has been designated for encryption. For example, if the administrator selected an encryption option button associated with a particular type of contact data, the encryption attribute will have a value of "1" and the encryption component 212 will encrypt the corresponding contact data prior to storage in the shared electronic directory 206. Alternatively, if the administrator did not select an encryption option button associated with a particular type of contact data, the encryption attribute will have a value of "0" and the encryption component 212 will not encrypt the corresponding contact data prior to storage in the shared electronic directory 206.

In one embodiment of the invention, the encryption component 212 encrypts contact data by employing a symmetric-key encryption process. That is, the same secret key (code) used to encrypt contact data on the server 204 will be used to decrypt the contact data on the telecommunication device 104. The encryption component 212 retrieves the symmetric key from a memory 214 of the server application 202 and executes an encryption algorithm to perform a mathematical operation on the designated contact data (e.g., encryption flag=1) to convert it into encrypted contact data. More specifically, the encryption algorithm is used in conjunction with the retrieved symmetric key to encrypt the contact data. As known to those skilled in the art, a number of encryption algorithms (e.g., 3DES and HMAC-RC4) can be used to encrypt data such that it is nearly impossible to decrypt the content without knowledge of the encryption key. Notably, it is contemplated that other encryption techniques, such as a public/private key pair method, could be used to implement aspects of the invention. A storage component 216 is responsive to the storage request 209 and the output from the encryption component 212 to store non-encrypted contact data and encrypted contact data in the shared electronic directory 206.

Figure 3A:
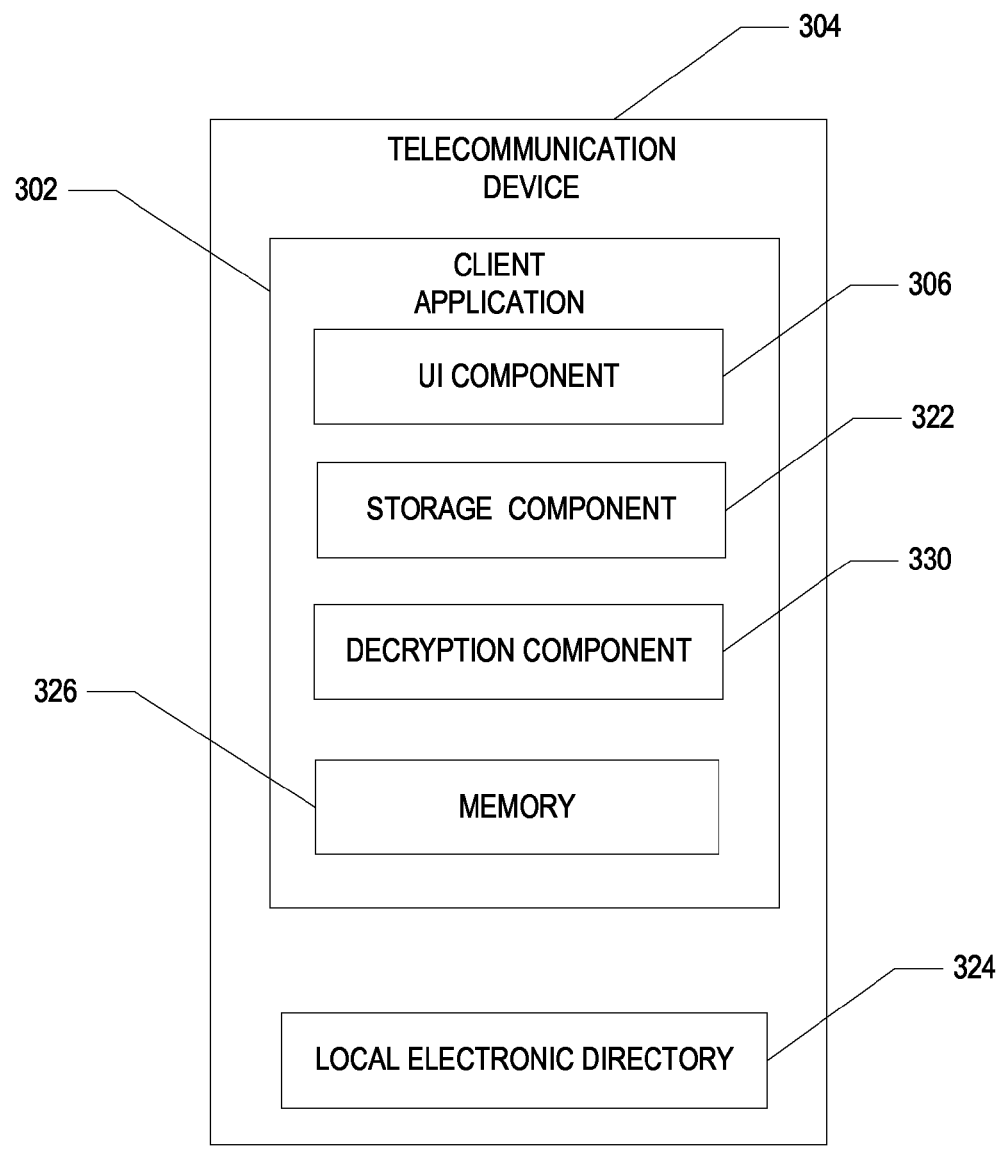
FIG. 3A is an exemplary block diagram illustrating components of a client application according to one embodiment of the invention.

Referring now to FIG. 3A, an exemplary block diagram illustrates components of a client application 302 (e.g., client application 117) being executed on a telecommunication device 304 (telecommunication device 104) for communicating with a server (e.g., server 204) to retrieve contact data of one or more individuals. In particular, the client application 302 communicates with a server via a wireless communication network to obtain encrypted and non-encrypted contact data from a shared electronic directory (e.g., shared electronic directory 110) maintained on the server.

Figure 3B:
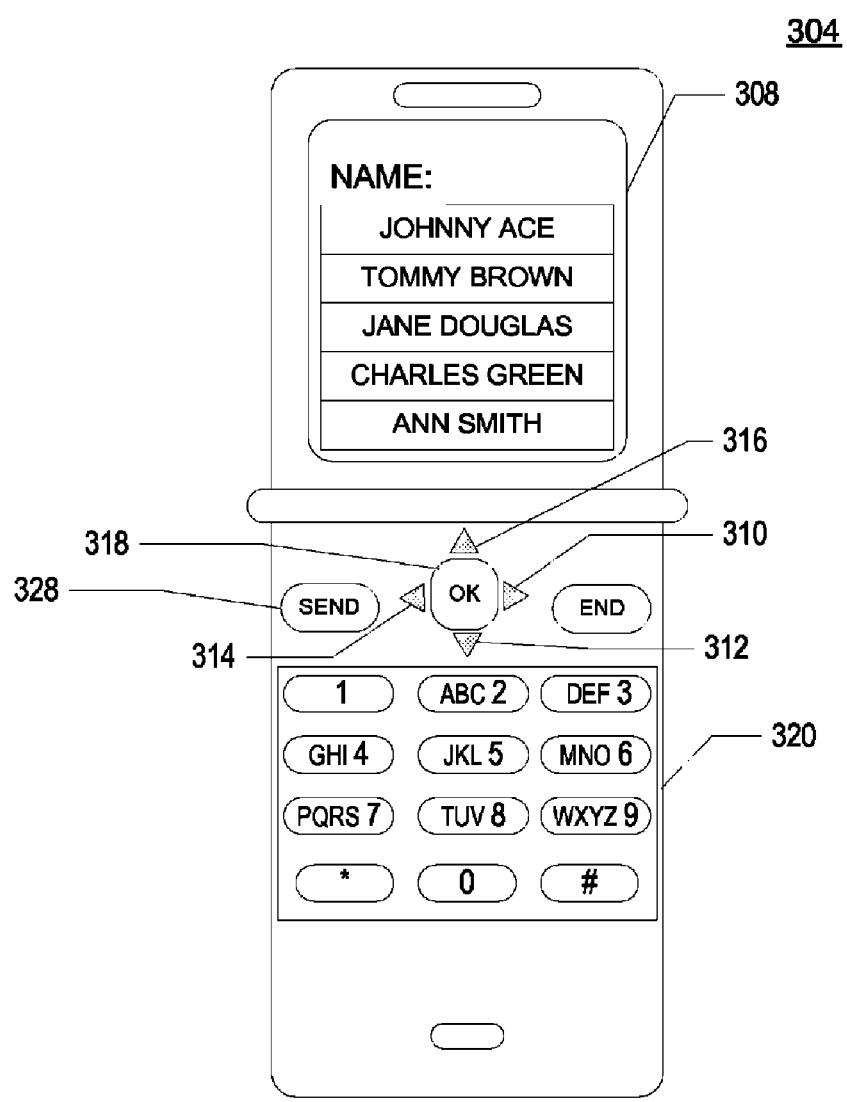
FIG. 3B is an exemplary telecommunication for interacting with a server according to one embodiment of the invention.

A UI component 306 is responsive to input received from a user of the telecommunication device 304 (e.g., telecommunication device 104) to generate a directory request (e.g., directory request 118) to retrieve contact data of a particular individual from a shared electronic directory. For example, the user of a telecommunication device 304 interacts with a graphical display displayed on a display of the telecommunication device 304 to select, a menu option that allows the user to retrieve contact data contained in a particular shared electronic directory located on a particular server. Referring briefly to FIG. 3B, there is shown an exemplary telecommunication device 304 capable of executing the client application 302 to retrieve contact data from a shared electronic directory on a server. The client application 302 displays various graphical user interfaces on a display 308 of the telecommunication device 304 in response to user input. For example, the client application 302 is responsive to user input to display, for example, an address book menu (not shown) on the display 308 that allows the user to view contact data stored in a local electronic directory, add or make edits to contact data in the local electronic directory, and/or download contact data from a shared electronic directory (e.g., shared electronic directory 206). The user uses direction keys 310, 312, 314, 316 and OK key 318 to select, for example, a download option from the phone menu to generate a directory request 208 to retrieve contact data from the shared electronic directory (e.g., shared electronic directory 206). The directory request 208 may also include authentication data used by the server 204 to authenticate the directory request 208. For example, after the user selects the download option, a login form (not shown) is displayed on the display 308 of the telecommunication device 304 and the user use the key pad 320 to enter identification and/or password data. Alternatively, the authentication data received along with the directory request 118 may correspond to a device ID associated with the particular telecommunication device 304 providing the directory request 118. For example, the telecommunication device 304 can have a unique device ID stored in a memory of the device 304. When a particular phone is first authorized to retrieve contact data from the shared directory of a particular server, an initial communication session is conducted between the server and the telecommunication device 304. During this initial communication session, the telecommunication device 304 provides the unique device ID to the server for storage.

Referring again to FIG. 2A, an authentication component 218 authenticates the directory request 118 to verify that the user of the telecommunication device 304 is authorized to access the shared electronic directory 206. The authentication component 218 authenticates the directory request 208 by comparing authentication data received from the telecommunication device 304 along with the directory request 118 to authorization data stored in a database 211 on the server 204. For example, the database 211 is a validation database that contains information necessary to validate a request from a client 116 (as well as other users on the network) to retrieve contact data from the shared directory 206. Although database 211 is shown contained within server 204, it is to be understood that in other embodiments of the invention, database 211 may be located on a separate authentication server (not shown) coupled to the server 204. Stored authentication data may include a password previously defined by the user of the telecommunication device 304 or a device ID previously provided from the telecommunication device 304. If authentication data received from the telecommunication device 304 does not match the authentication data stored in the database 211 the user is not authenticated and the user is denied access to the stored electronic directory. On the other hand, if the authentication data received from the telecommunication device 304 matches the authentication data stored in the database 211, the user is authenticated, and allowed to retrieve contact data from the shared directory 206.

A transfer component 220 is responsive to an authenticated directory request to transfer contact data to the telecommunication device 304. The transfer component 220 also retrieves the symmetric key used to encrypt designated contact data and a key expiration parameter from memory 214, and transfers the retrieved key and key expiration parameter to the telecommunication device 304. The key expiration parameter defines a maximum duration of time that the retrieved symmetric key can be used by the client application 302 of the telecommunication device 304 to decrypt encrypted contact data. For example, the key expiration parameter may set a maximum period of six (6) hours, beginning from the time encrypted content is transferred from the server 204 to the telecommunication device 304, during which the key can be used by the telecommunication device 304 to decrypt encrypted contact data.

In one embodiment, the transfer component 220 retrieves the contact expiration parameter from memory 214 prior to transferring encrypted and non-encrypted content to the telecommunication device 304. If the period of time authorized by a particular user for maintaining their contact data in the directory has expired, the transfer component 220 will not transfer any contact data of that particular individual to the telecommunication device 304.

Referring again to FIG. 3A, a storage component 322 of the client application 302 is responsive to contact data transferred from the shared directory 206 of the server 204 to store the received contact data in a local directory 324. The storage component 322 also stores the key along with an expiration parameter in a memory 326 of the telecommunication device 304. Thereafter, after the UI component 306 is responsive to user input to display non-encrypted contact data stored in the local directory 324 on the display 308 of the telecommunication device 304. For example, non-encrypted contact data such as the first and last names of individuals can be displayed on the display 308 of the telecommunication device 304.

In operation, a user of the telecommunication device 304 uses, for example, the direction keys 312 and 316 on the telecommunication device 304 to select the name of a particular individual displayed on the display 308. The user presses a send key 328 (See FIG. 3B) to initiate a call to that particular individual. A decryption component 330 is responsive to user input (i.e., pressing the send key 328) to retrieve the decryption key from the memory 326 of the telecommunication device 304 and executes a decryption algorithm to perform a mathematical operation on the corresponding encrypted contact data, such as the particular individual's telephone number, to initiate the call using a convention telecommunication protocol. According to one aspect of the invention, the UI component 306 prevents decrypted contact data from being displayed on the display 308 of the of the telecommunication device 304. That is, even after the decryption component 324 has decrypted contact data, the UI component 306 will not allow any decrypted contact data to be displayed on the display 308 of the telecommunication device 304.

Referring now to FIG. 4, an exemplary flow chart illustrates a method for storing contact data of one or more individuals in shared directory according to one exemplary embodiment of the invention. A storage request is received by a server on which the shared directory is located from an administrator of the server at 402. As described above, the storage request includes contact data of a particular individual the administrator would like to add to the shared electronic directory 206. At 404, a server application executing on the server is responsive to the storage request to determine a value of an encryption attribute associated with content included in the received contact data received at 402 to identify content designated for encryption. The server application encrypts the designated content of the contact data as a function of a symmetric key retrieved from memory at 406. The server application stores encrypted content and non-encrypted content in the shared directory at 408. In other words, content designated for encryption is stored in the shared directory in an encrypted format, and, content that is not designated for encryption is stored in the directory in a non-encrypted format.

Figure 5:
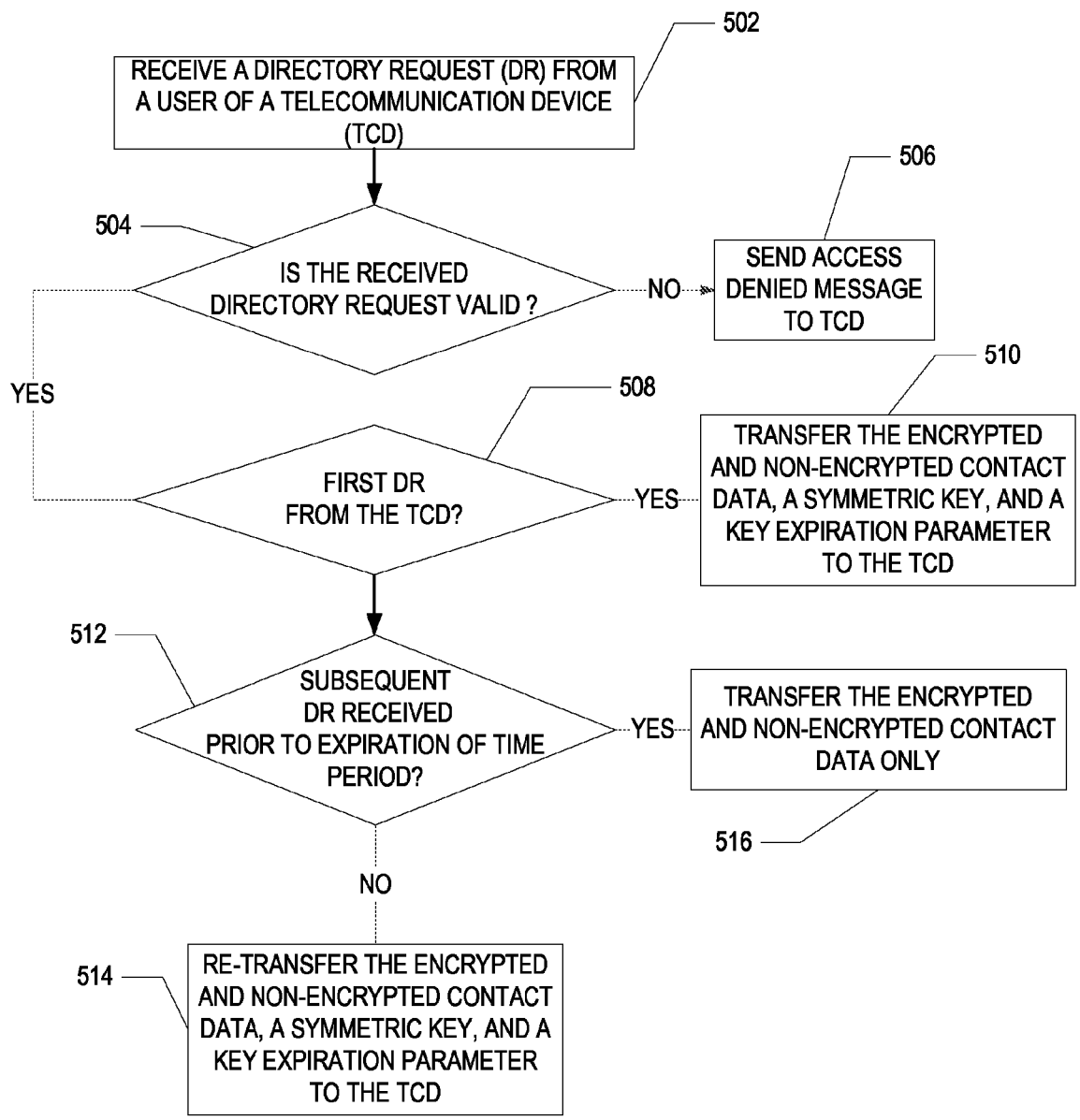
FIG. 5 is an exemplary flow chart illustrating a method for transferring contact data from a server to a telecommunication device according to one exemplary embodiment of the invention.

Referring now to FIG. 5, an exemplary flow chart illustrates a method for transferring contact data of one or more individuals from a server to a telecommunication device according to one exemplary embodiment of the invention. A directory request is received at the server from the user of a telecommunication device at 502. At 504, the server application determines if the received directory request is valid. For example the server application compares authentication data (e.g., password) received along with the directory request to authorization data stored in a database on the server to determine if the directory request is valid. If the directory request is determined invalid at 504 (e.g., received authentication data does not match stored authentication data), the user of the telecommunication device is denied access to the shared directory at 506. Alternatively, if the directory request is determined valid at 504 (e.g., received authentication data matches the stored authentication data), the server application determines if the received directory request is the first directory request received from the telecommunication device at 508. For example, the first time the server application transfers contact data to the telecommunication device, a unique cookie is transferred and stored on the telecommunication device. Thus, the server application can determine if the received directory request is the first directory request by determining if a cookie was previously stored on the telecommunication device. If the server application determines that the received directory request is the first directory request received from the telecommunication device at 508, the server application transfers contact data, the symmetric key, and a key expiration parameter to the telecommunication device at 510. As described above, the expiration parameter defines a period of time during which the symmetric key can be used on the telecommunication device to decrypt encrypted contact data. In addition to transferring a unique cookie to the telecommunication device in response to a directory request, the server application transfers time stamp data along with the cookie. Accordingly, the server application can determine how long after the initial transfer of contact data, a subsequent directory request is received by comparing the previously transferred time stamp data with current time data. If the server application determines that the received directory is not the first directory request received from the telecommunication device at 508, the server application determines if the subsequent directory request is received prior the expiration of the time period defined by the key expiration parameter at 512. If the server application determines the subsequent directory request is retrieved after the expiration of the time period defined by the key expiration parameter at 512, the server application will re-transfer contact data, the symmetric key, and a new key expiration parameter at 514. Notably, although the key expiration parameter may define the same amount of time (e.g., 6 hours), time period during which the symmetric key can be used will begin from the time the contact data is re-transferred to the telecommunication device and end, for example, six hours from the re-transfer time. If the server application determines the subsequent directory request is retrieved prior to the expiration of the time period defined by the key expiration parameter at 512, the server application will only re-transfer encrypted and non-encrypted contact data at 516. As a result, even authorized users of telecommunication devices will have to periodically re-authenticate themselves to the server application to retrieve a new key expiration parameter so that the symmetric key can be used to decrypt encrypted contact data.

Figure 6:
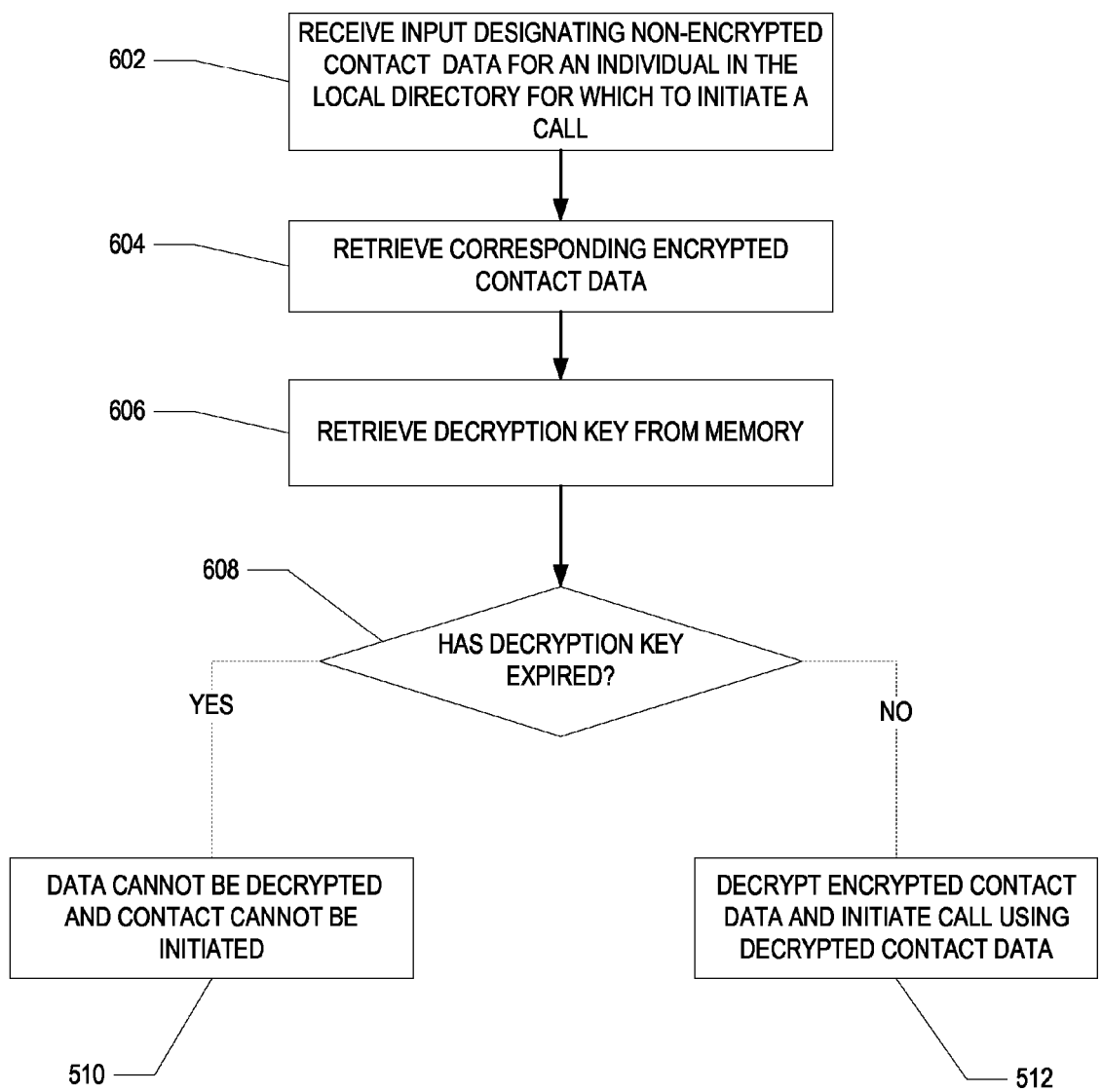
FIG. 6 is an exemplary flow chart illustrating a method for initiating contact via a telecommunication device using encrypted contact data received from a server according to one exemplary embodiment of the invention.

Referring now to FIG. 6, an exemplary flow chart illustrates a method for initiating contact via a telecommunication device using encrypted contact data received from a server according to one exemplary embodiment of the invention. A client application receives user input designating non-encrypted contact data of a particular individual for which to initiate contact at 602. For example, the user selects and enters non-encrypted contact data such as the first name of a particular individual displayed on a display of the telecommunication device. At 604, the client application is responsive to the received user input to retrieve corresponding encrypted contact data such as the particular individuals encrypted phone number. The client application retrieves a decryption key and an expiration parameter associated with the decryption key from memory at 606. At 608, the client application determines if the decryption key has expired based on the associated expiration parameter. For example, as described above, the expiration parameter defines a maximum time period that the telecommunication device can be used by the client application of the telecommunication to decrypt encrypted contact data. If the client application determines the decryption key has expired at 608, the client application cannot decrypt the encrypted contact data and, thus, is prevented from initiating contact with the particular individual at 610. If the client application determines the decryption key has not expired at 608, the client application decrypts the encrypted contact data and initiates contact with the particular individual at 612.

In operation, server 102 and telecommunication device 104 executes computer-executable instructions such as those illustrated in the figures to implement embodiments of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of embodiments of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of initiating a telephone call with a telecommunication device using encrypted contact data received from a server, said method comprising:

generating, at the telecommunication device, a directory request to receive contact data for a plurality of individuals from an electronic directory, said contact data being stored in the electronic directory on the server, said contact data for each individual including encrypted content and non-encrypted content;

receiving, at the telecommunication device, the encrypted content and the non-encrypted content of the plurality of individuals from the server, said non-encrypted content include a contact data expiration parameter, said contact data expiration parameter indicating a specific duration of time during which the contact data of the particular individual has been authorized for storage in the local electronic directory;

determining, at the telecommunication device, if the received contact data is authorized for storage in the memory of the telecommunication device as a function of the received contact data expiration parameter, wherein the received contact data is determined to be authorized for storage if the specific duration of time during which the contact data of the particular individual has been authorized for storage has not expired, and wherein the received contact data is determined to be unauthorized for storage if the specific duration of time during which the contact data of the particular individual has been authorized for storage has expired;

based on said determining, storing, at the telecommunication device, the received encrypted content and the received non-encrypted content in an electronic directory of the telecommunication device when the received encrypted content and the received non-encrypted content is authorized for storage, said electronic directory being local to the telecommunication device;

displaying, at the telecommunication device, only the non-encrypted content of the received contact data for the plurality of individuals in the local electronic directory on a display of the telecommunication device;

receiving, at the telecommunication device, input from a user selecting a particular individual of the plurality of individuals in the local electronic directory to call;

responsive to said receiving, identifying, at the telecommunication device, encrypted content included in the received contact data of the selected particular individual of the plurality of individuals;

responsive to said identifying, receiving, at the telecommunication device, decryption data from the server for storage in a memory of the telecommunication device, wherein said decryption data includes a decryption key specified by the server, said decryption data further including a key expiration parameter, said key expiration parameter defining a period of time during which the server specified decryption key can be used by the telecommunication device to decrypt encrypted content;

responsive to said identifying, decrypting, by the telecommunication device using the decryption key included in the received decryption data, the identified encrypted content in the received contact data for the selected particular individual of the plurality of individuals; and using the decrypted content, at the telecommunication device, to initiate a telephone call to the selected particular individual without displaying the decrypted content on the display of the telecommunication device.

2. The method of claim 1, wherein the decryption key is a single-use session key randomly generated by the server.

3. The method of claim 1, wherein the content of the contact data includes one or more of the following:
a first name;
a last name;
a job title;
an employer name;
a work phone number; and
a mobile phone number.

4. The method of claim 1, wherein the generated directory request includes authentication data, and wherein contact data is received at the telecommunication device from the server when the authentication data included in the directory request is validated by the server, and wherein contact data is not received from the server when the authentication data included in the directory request is not validated by the server.

5. A system for initiating a telephone call with a telecommunication device using encrypted contact data received from a server, said system comprising:

a user interface component responsive to a first input received from a user of the telecommunication device for sending, by the telecommunication device, a directory request to the server to retrieve contact data for a plurality of individuals from an electronic directory stored on the server, said contact data for each said individual including encrypted content and non-encrypted content, said contact data including a contact data expiration parameter indicating a specific duration of time during which the contact data for each individual has been authorized for storage on the telecommunication device;

a storage component for receiving, at the telecommunication device, the requested contact data including the encrypted content and the non-encrypted content for the plurality of individuals from the server and for storing the received contact data for the plurality of individuals in an electronic directory of the telecommunication device when the received contact data is determined to be authorized for storage based on the contact data expiration parameter, said electronic directory being local to the telecommunication device;

wherein said user interface component is responsive to the received contact data to display only the non-encrypted content of the received contact data for the plurality of individuals in the local electronic directory on a display of the telecommunication device; and a decryption component responsive to a second input received from the user selecting a particular one of the plurality of individuals being displayed for which to initiate a call to decrypt the encrypted content of the contact data corresponding to the particular individual at the telecommunication device and to use the decrypted content to initiate a call to the particular individual;

wherein the storage component further receives, at the telecommunication device, decryption data from the server for storage in a memory of the telecommunication device responsive to receiving the requested contact data, and wherein said decryption data includes a decryption key specified by the server that is used by the decryption component to decrypt the encrypted content.

6. The system of claim 5, wherein the received decryption data further includes a key expiration parameter, said key expiration parameter defining a period of time during which the decryption key can be used by the decryption component to decrypt encrypted content at the telecommunication device.

7. The system of claim 5, wherein user interface component further prevents decrypted contact data from being displayed on the display of the telecommunication device.

* * * * *

UNITED STATES PATENT AND TRADEMARK OFFICE
CERTIFICATE OF CORRECTION

| | | |
|---|---|---|
| PATENT NO. | : 8,254,891 B2 | |
| APPLICATION NO. | : 11/462434 | |
| DATED | : August 28, 2012 | |
| INVENTOR(S) | : Abhishek Kumar Mishra | |

It is certified that error appears in the above-identified patent and that said Letters Patent is hereby corrected as shown below:

On the title page, Item [54:] and in the Specification, Column 1, Line 1, Title,

"INITIATING CONTACT USING PROTECTED CONTACT DATA IN AN ELECTRONIC DIRECTORY"

Should read:
"INITIATING TELEPHONIC CONTACT USING ENCRYPTED CONTACT DATA IN AN ELECTRONIC DIRECTORY"

Signed and Sealed this
Sixteenth Day of July, 2013

Teresa Stanek Rea
*Acting Director of the United States Patent and Trademark Office*